United States Patent
Farkas

(10) Patent No.: US 11,509,172 B2
(45) Date of Patent: Nov. 22, 2022

(54) WIRELESS CHARGING SYSTEM AND ASSOCIATED METHODS

(71) Applicant: CHAIRGE LLC, Wilmington, DE (US)

(72) Inventor: Alexander T. Farkas, Chatham, MA (US)

(73) Assignee: CHAIRGE LLC, Wilmington, DE (US)

(*) Notice: Subject to any disclaimer, the term of this patent is extended or adjusted under 35 U.S.C. 154(b) by 84 days.

(21) Appl. No.: 17/091,332

(22) Filed: Nov. 6, 2020

(65) Prior Publication Data
US 2021/0143681 A1  May 13, 2021

Related U.S. Application Data

(60) Provisional application No. 62/931,930, filed on Nov. 7, 2019.

(51) Int. Cl.
| | |
|---|---|
| *H02J 50/20* | (2016.01) |
| *H02J 7/02* | (2016.01) |
| *H02J 50/40* | (2016.01) |
| *H02J 50/30* | (2016.01) |
| *H02J 50/00* | (2016.01) |
| *H02J 50/70* | (2016.01) |

(52) U.S. Cl.
CPC ............ *H02J 50/20* (2016.02); *H02J 7/02* (2013.01); *H02J 50/30* (2016.02); *H02J 50/40* (2016.02); *H02J 50/005* (2020.01); *H02J 50/70* (2016.02)

(58) Field of Classification Search
CPC ....................................................... H02J 50/20
USPC ............................................................ 320/108
See application file for complete search history.

(56) References Cited

U.S. PATENT DOCUMENTS

| | | | |
|---|---|---|---|
| 6,220,516 B1* | 4/2001 | Tuttle ................... | G01S 13/767 235/492 |
| 8,981,714 B2 | 3/2015 | Miller et al. | |
| 9,312,924 B2 | 4/2016 | Ozaki et al. | |
| 2003/0210203 A1 | 11/2003 | Phillips et al. | |

(Continued)

OTHER PUBLICATIONS

International Application No. PCT/US2020/059354 International Search Report and Written Opinion, dated Mar. 30, 2021, 13 pages.

*Primary Examiner* — Edward Tso
*Assistant Examiner* — Ahmed H Omar
(74) *Attorney, Agent, or Firm* — Lathrop GPM LLP

(57) ABSTRACT

A wireless charging system concurrently charges several wireless devices within a shielded chamber acting as a hollow electromagnetic waveguide. Electrically conductive walls of the chamber create transverse modes that support longitudinal propagation of the electromagnetic field along the waveguide with no diminution of the energy flux density due to the inverse-square law. A transmitting antenna located inside the chamber emits an electromagnetic field that excites one or more transverse modes of the waveguide. An absorptive lid absorbs the electromagnetic field to minimize reflections that could excite longitudinal modes. Each wireless device includes a whisker antenna that receives part of the electromagnetic field for charging a battery. Due to the spatial uniformity of the electromagnetic field, the wireless devices charge with high efficiency regardless of their positions, ensuring they all charge at a similar rate.

20 Claims, 6 Drawing Sheets

(56) References Cited

U.S. PATENT DOCUMENTS

| | | | |
|---|---|---|---|
| 2006/0234787 A1* | 10/2006 | Lee | H05K 7/1412 |
| | | | 455/575.1 |
| 2010/0289341 A1* | 11/2010 | Ozaki | H04B 5/0075 |
| | | | 307/104 |
| 2011/0187328 A1 | 8/2011 | Yamazaki et al. | |
| 2013/0241468 A1 | 9/2013 | Moshfeghi | |
| 2016/0064794 A1* | 3/2016 | Henry | H04B 3/38 |
| | | | 333/240 |
| 2016/0241077 A1* | 8/2016 | Lee | H02J 50/10 |
| 2016/0372948 A1 | 12/2016 | Kvols | |
| 2017/0187229 A1 | 6/2017 | Hosseini | |

* cited by examiner

WIRELESS CHARGING SYSTEM AND ASSOCIATED METHODS

CROSS-REFERENCE TO RELATED APPLICATION

This application claims priority to U.S. Provisional Patent Application No. 62/931,930, filed Nov. 7, 2019 and titled "Wireless Charging System and Associated Methods", the entirety of which is incorporated herein by reference.

BACKGROUND

Capacitive and inductive coupling are two techniques for wireless power transfer (WPT) that may be used to charge a battery in a hermetically sealed electrical device without electrical contact (e.g., via wire or electrically-conductive contacts). With these techniques, a time-varying electromagnetic field generated by a charger penetrates a hermetic barrier that encapsulates and seals the electrical device. The energy of the electromagnetic field is received by the electrical device to produce an alternating (AC) current that can be rectified into a direct (DC) current for charging the battery.

SUMMARY OF THE EMBODIMENTS

Embodiments herein charge one or more wireless devices (e.g., RFID tags, tracking tags, etc.) both simultaneously and without direct electrical contact. Each wireless device includes an energy-storage component, such as a rechargeable battery, and may be hermetically sealed to protect components therein from an outside environment (e.g., to prevent ingress of moisture and debris). Such wireless devices may be embedded in clothing and other objects, such as athletic apparel, equipment, and balls.

One aspect of the present embodiments is the realization that simultaneously charging multiple wireless devices with one charger using prior-art wireless power transfer (WPT) techniques is impractical since all the wireless devices cannot be located sufficiently close to the charger to ensure efficient power transfer and rapid charging. For example, consider a sporting event where more than one hundred of these wireless devices are used to track the locations of athletes, equipment, and referees. Charging so many wireless devices individually is prohibitively time consuming and labor intensive.

With prior-art WPT techniques, there is a trade-off between a volume of space within which the wireless devices are located during charging, and an energy flux density radiating throughout the volume of space. To appreciate this trade-off, consider charging a single wireless device, where a power-transfer efficiency is highest when the wireless device is immediately adjacent to the one charger, i.e., where the energy flux density of the electromagnetic field emitted by the one charger is highest. In this case, the location of the wireless device precludes additional wireless devices from being located similarly close to the charger, and thus from benefiting from the highest energy flux density. These additional wireless devices must therefore be located farther from the charger, where charging efficiency is reduced. Specifically, for WPT based on electromagnetic radiation, the energy flux density decreases with distance from the one wireless charger according to the inverse-square law, and thus the charging efficiencies drop similarly with distance. In this situation, the wireless devices charge with varying efficiencies, as based on their varying distances from the charger, and thus require different durations to fully charge. Only the few, at most, wireless devices closest to the one charger can charge with sufficient efficiency to make WPT of multiple wireless devices effective.

The present embodiments overcome this trade-off by using a hollow waveguide to confine an electromagnetic field propagating therein such that its Poynting vector does not decrease according the inverse-square law, as is the case for dipole radiation propagating in free space. A hollow waveguide is a tube whose side walls are formed from an electrically conductive material that establishes a boundary condition that the tangential component of the electric field, of the propagating electromagnetic field, approaches zero at the walls. This boundary condition gives rise to transverse modes that, when excited, support longitudinal propagation of the electromagnetic field down the waveguide with no diminution of the energy flux density due to the inverse-square law. That is, the electromagnetic field is guided along the waveguide in the form of a longitudinal traveling-wave component and a two-dimensional transverse standing-wave component.

Accordingly, embodiments herein include a wireless charging system, and associated methods, with improved WPT that concurrently charges a plurality of wireless devices within a shielded chamber acting as a hollow electromagnetic waveguide. Advantageously, the plurality of wireless devices is charged with high efficiency regardless of their longitudinal positions inside the chamber, thereby ensuring that all the devices charge at a similar rate. A transmitting antenna located inside and towards a first end wall of the chamber, emits an electromagnetic field that is received by each of the wireless devices. Each wireless device includes a whisker antenna that receives a portion of the electromagnetic field as an alternating, or AC, current, and a rectifier that converts the AC current into a direct, or DC, current that may be used to charge a rechargeable battery, or other energy-storage component, within the wireless device.

Advantageously, one or more wireless devices embedded in another object (e.g., clothing, balls, etc.) can be charged with high efficiency within the wireless charging system. The size of the object may prevent the wireless device from being placed close enough to a prior-art charger to ensure efficient power transfer using prior-art WPT in free space. The present embodiments solve this problem by making the shielded chamber large enough to accommodate one or more objects within which wireless devices are embedded. Each of these objects may be several times larger than a single wireless device.

DETAILED DESCRIPTION OF THE EMBODIMENTS

Wireless Power Transfer in Free Space

Figure 1:
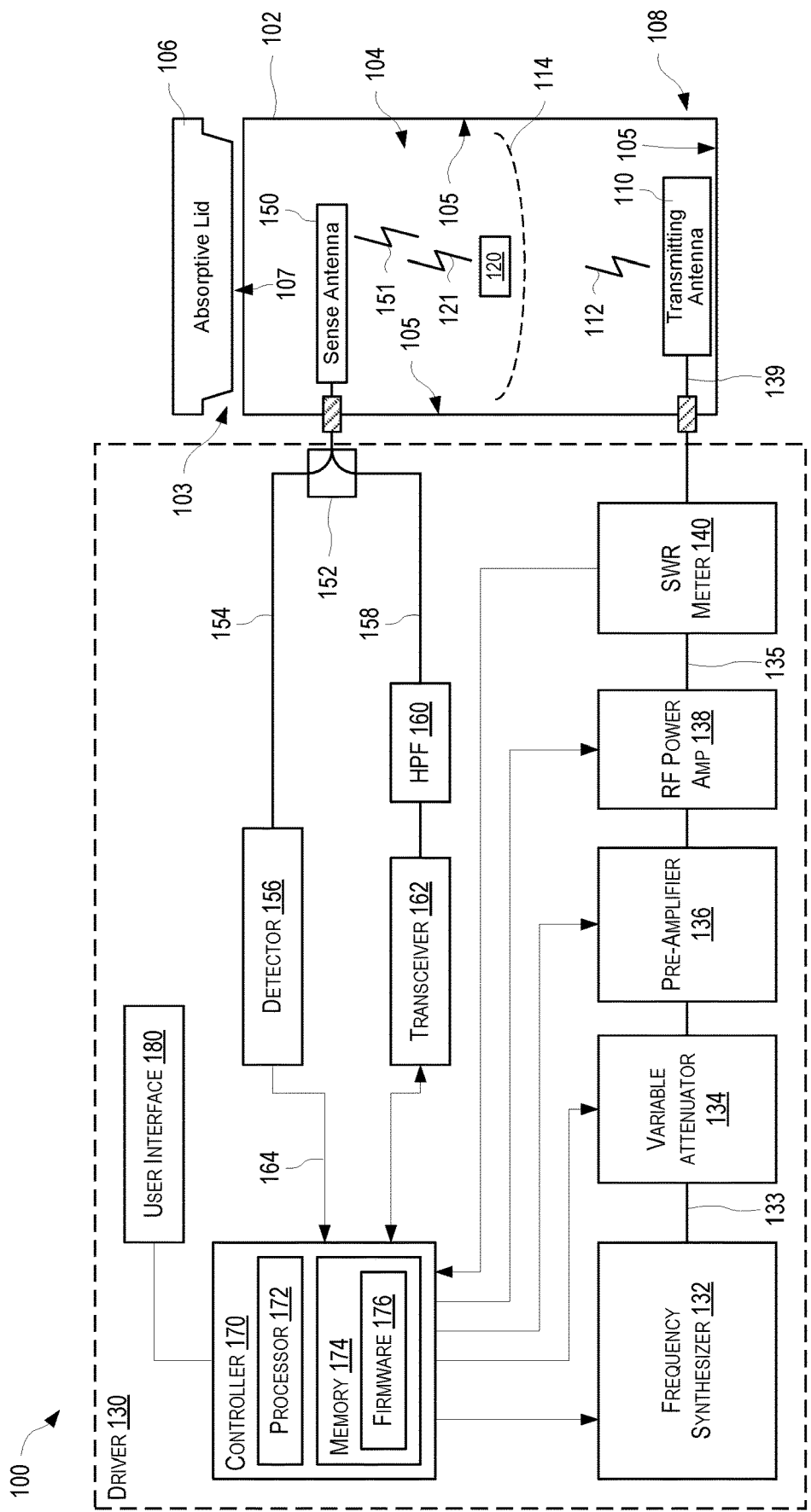
FIG. 1 is a functional diagram illustrating one example wireless charging system for simultaneously charging at least one wireless device, in embodiments.

The efficiency η with which power can be wirelessly transferred from a charger to an electrical device depends on the distance d therebetween, among other variables. For example, in wireless power transfer (WPT) based on inductive coupling, the charger drives a first inductor to generate an oscillating magnetic field that induces an AC current in a second inductor located in the electrical device. The efficiency η scales as the square of the mutual inductance $M_{12}$ between the two inductors. When the inductors are counterfacing co-axial circular loops with the same radius $r_0$, the mutual inductance $M_{12}$ can be expressed mathematically as $$M_{12} = \frac{\mu_0 \pi}{2} \frac{r_0^4}{(r_0^2 + d^2)^{3/2}}, \tag{1}$$

where $\mu_0$ is the permeability of free space. The efficiency η is highest in the limit $d \ll r_0$. In this case, Taylor-expanding the square of the mutual inductance $M_{12}$ yields $$\eta = k r_0^2 \left(1 - \frac{3d^2}{r_0^2} + \ldots\right) \text{ for } d \ll r_0, \tag{2}$$

where k is a constant such that all values of η lie between 0 (i.e., perfect inefficiency) and 1 (perfect efficiency). In Eqn. 2, the efficiency η approaches 1 as the distance d approaches 0, reflecting the fact that as the electrical device is brought closer to the charger, more of the magnetic flux generated by the first inductor couples into the second inductor. In the opposite limit of $d \gg r_0$, the efficiency η is approximated by $$\eta = k \frac{r_0^8}{d^6} \left(1 - \frac{3r_0^2}{d^2} + \ldots\right) d \gg r_0, \tag{3}$$

where the dominant term, scaling as $1/d^6$, reflects the fact that when the electrical device is far from the charger, almost all the magnetic flux generated by the first inductor "misses" the second inductor. To ensure that the efficiency η is large enough for WPT to be effective, the wireless device is usually placed closer than $r_0$ to the charger.

Similar equations can be derived for WPT based on capacitive coupling. In this case, the charger drives a first electrode to generate an oscillating electric field that induces the AC current in a second electrode in the electrical device. When the electrodes form a parallel-plate capacitor with plates having the same characteristic dimension $r_0$ and separated by a distance d, the efficiency η approaches 1 in the limit of $d \ll r_0$. In this limit, essentially all the electric flux generated by the first plate couples to the second plate. In the opposite limit of $d \gg r_0$, the efficiency η drops rapidly with the distance d as more of the electric flux "misses" the second electrode. Like inductive coupling, the wireless device is usually placed closer than $r_0$ to the charger to ensure that η is large enough for WPT to be effective.

WPT may also be implemented via electromagnetic radiation emitted by a transmitting antenna in the charger, wherein the electrical device includes a receiving antenna that receives the electromagnetic radiation to generate the AC current. In this case, the efficiency η is proportional to the time-averaged Poynting vector (i.e., the energy flux density, or energy transferred per unit time through a surface of unit area) of the electromagnetic radiation, which scales as $1/d^2$ (d being the distance between the two antennae) and thus follows the well-known inverse-square law. Although beamforming techniques may be used to increase power transmission by shaping the radiation as a beam, the energy flux density of the beam still decreases as $1/d^2$ according to the Rayleigh criterion.

Due to the $1/d^2$ scaling with distance, WPT based on electromagnetic radiation can be effectively implemented at larger distances between the charger and electrical device, as compared to inductive and capacitive coupling. For inductive coupling, this difference can be seen in Eqn. 3, where the dominant term scales as indicating that the reactive (i.e., non-radiative) near field generated by the first inductor is the primary vehicle for power transmission. Although not shown explicitly, the same is true for WPT based on capacitive coupling. Far-field electromagnetic radiation differs from these reactive near fields in that the far-field does not back-couple to the transmitter (i.e., the first inductor, the first cathode, or the transmitting antenna) to distort the electromagnetic field.

In the above example of inductive coupling, the first inductor can be resonantly driven to generate the far-field electromagnetic radiation in addition to the near field. That is, the first inductor can act as a loop antenna, and thus serve as the transmitting antenna for WPT based on electromagnetic radiation. In the electrical device, the second inductor may serve as the receiving antenna that receives the electromagnetic radiation. The first inductor may alternatively be driven non-resonantly to minimize the electromagnetic radiation. For capacitive coupling, the first electrode can be driven resonantly to generate the far-field electromagnetic radiation, and thus can serve as the transmitting antenna. Similarly, the second electrode may serve as the receiving antenna that receives the electromagnetic radiation.

As will be appreciated by those trained in the art, the difference between the terms "near field" and "far field" is not clearly delineated and depends on context. The transition between these two regions may be defined as a boundary occurring as close as $\lambda/(2\pi)$ to, and as far as $2\lambda$-$3\lambda$ from, the transmitting antenna. In other cases, the transition is defined as a zone typically located $1\lambda$-$2\lambda$ away from the transmitting antenna. The near-field region may also be divided into a reactive near-field region that is closer to the transmitting antenna than a radiative near-field region. The radiative near-field region is "radiative" in the sense that the fields therein are sufficiently out-of-phase with an oscillating signal driving the transmitting antenna that reactive energy stored in the fields cannot return to the transmitting antenna, and "near-field" in the sense that the electric and magnetic components of the fields therein are still not in-phase, as is the case for far-field electromagnetic radiation.

Wireless Power Transfer with Hollow Electromagnetic Waveguides

Embodiments herein include a wireless charging system, and associated methods, that improve WPT charging of multiple wireless devices via electromagnetic radiation. The wireless devices are placed inside a shielded chamber that acts as a hollow waveguide to confine and guide electromagnetic fields therein. For clarity in the following discussion, the shielded chamber is a square cuboid; however, the shielded chamber may have a differently shaped cross-section (e.g., oval, circular, rectangular, etc.) without departing from the scope hereof. The square cuboid shielded chamber forms a hollow waveguide with a square cross-section of length a in both the transverse x and y directions. That is, the waveguide is defined by the intersection of a first side wall lying at x=0, a second side wall lying at x=a, a third side wall lying at y=0, and a fourth side wall lying at y=a. The waveguide may be driven (i.e., with an appropriate frequency and polarization) such that only the lowest-frequency transverse-electric (TE) mode of the waveguide, also known as the $TE_{10}$ mode, is excited. In this case, the energy flux density along the longitudinal z direction is given by the Poynting vector $$P_Z(x) = \frac{1}{\eta_{TE}}|E_0|^2\sin^2\left(\frac{\pi x}{a}\right), \quad (4)$$

where $E_0$ is the amplitude of the transverse electric field, $\eta_{TE}$ is the transverse wave impedance of the electromagnetic field in the $TE_{10}$ mode. From Eqn. 4, the power available for a wireless device goes to zero near the first and second side walls, and thus the wireless devices should not be placed too close to these side walls. Nevertheless, at the center of the waveguide, where Eqn. 4 has a maximum, the Poynting vector varies sufficiently slowly with x that multiple wireless devices can be placed in this region and have similar power transfer efficiencies. Although the waveguide may be driven to excite higher transverse modes, the Poynting vectors for these higher modes have more peaks and valleys that reduce spatial uniformity in the transverse directions. The waveguide may also be driven to be overmoded (i.e., simultaneously exciting several modes) to improve spatial uniformity.

To further enhance spatial uniformity of the Poynting vector throughout the chamber, the wireless charging system includes an absorptive lid forming a second end wall, opposite the first end wall, of the chamber. The absorptive lid may be opened to facilitate entry of wireless devices into the chamber, and removal therefrom. When closed, the absorptive lid acts as a termination for the waveguide. Specifically, the reflection coefficient $\rho$ and transmission coefficient $\tau$ at the boundary between the chamber and lid (see inner-facing surface 107 in FIG. 1) can be expressed mathematically as:

$$\rho = \frac{\eta_2 - \eta_1}{\eta_2 + \eta_1} \quad (5)$$

$$\tau = \frac{2\eta_2}{\eta_2 + \eta_1},$$

where $\eta_1$ and $\eta_2$ are the impedances of the waveguide (e.g., see $\eta_{TE}$ in Eqn. 5) and lid, respectively. From Eqn. 5, there is no reflection if impedances $\eta_1$ and $\eta_2$ are equal. The fraction of the incident power density reflected is $|\rho|^2$ and the fraction of the incident power density transmitted into the lid is $1-|\rho|^2$.

Advantageously, the absorptive lid prevents longitudinal standing waves from arising in the chamber. Due to their nodes and antinodes, longitudinal standing waves cause longitudinal variations in energy flux density, thereby causing the charging efficiency to become dependent on the positions of the wireless devices. With the lid, the electromagnetic field propagates longitudinally through the chamber as a traveling wave without nodes and antinodes, thereby ensuring spatial uniformity of the Poynting vector in the longitudinal direction.

To further reduce the occurrence of longitudinal modes, the length of the chamber in the longitudinal direction (i.e., the distance between the first and second end walls) may be comparable to, or less than, one-half the wavelength A of the electromagnetic field. In addition, the absorptive lid may be textured so that the unabsorbed portion of the electromagnetic field, when impinging on the lid, scatters in various directions and is thus less likely to excite a longitudinal mode.

The side walls and first end wall of the chamber may be made from metal, such as copper foil, sheet, or plate. The metal should have a thickness of several skin depths to minimize penetration of the electromagnetic field through the walls. Advantageously, the walls and lid prevent electromagnetic energy from leaking out of the chamber, where it could potentially interfere with other electrical devices or cause a health hazard. Thus, the antenna inside the chamber can be driven with high power (e.g., up to 20 W, or more), to charge the wireless devices faster, while ensuring that the surrounding area is safe.

A Wireless Charging System for Multiple Wireless Devices

Figure 2:
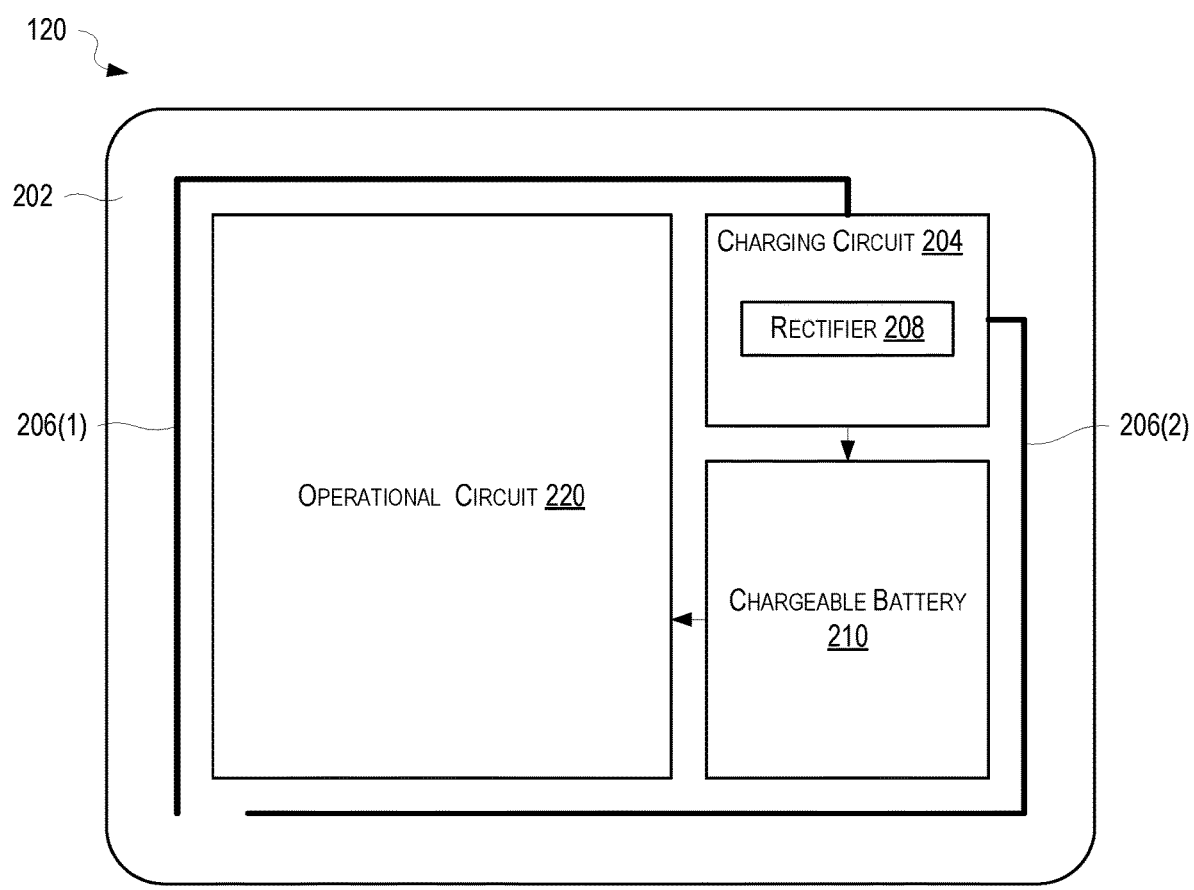
FIG. 2 is a schematic diagram showing one example of the wireless device of FIG. 1, in embodiments.
Figure 3:
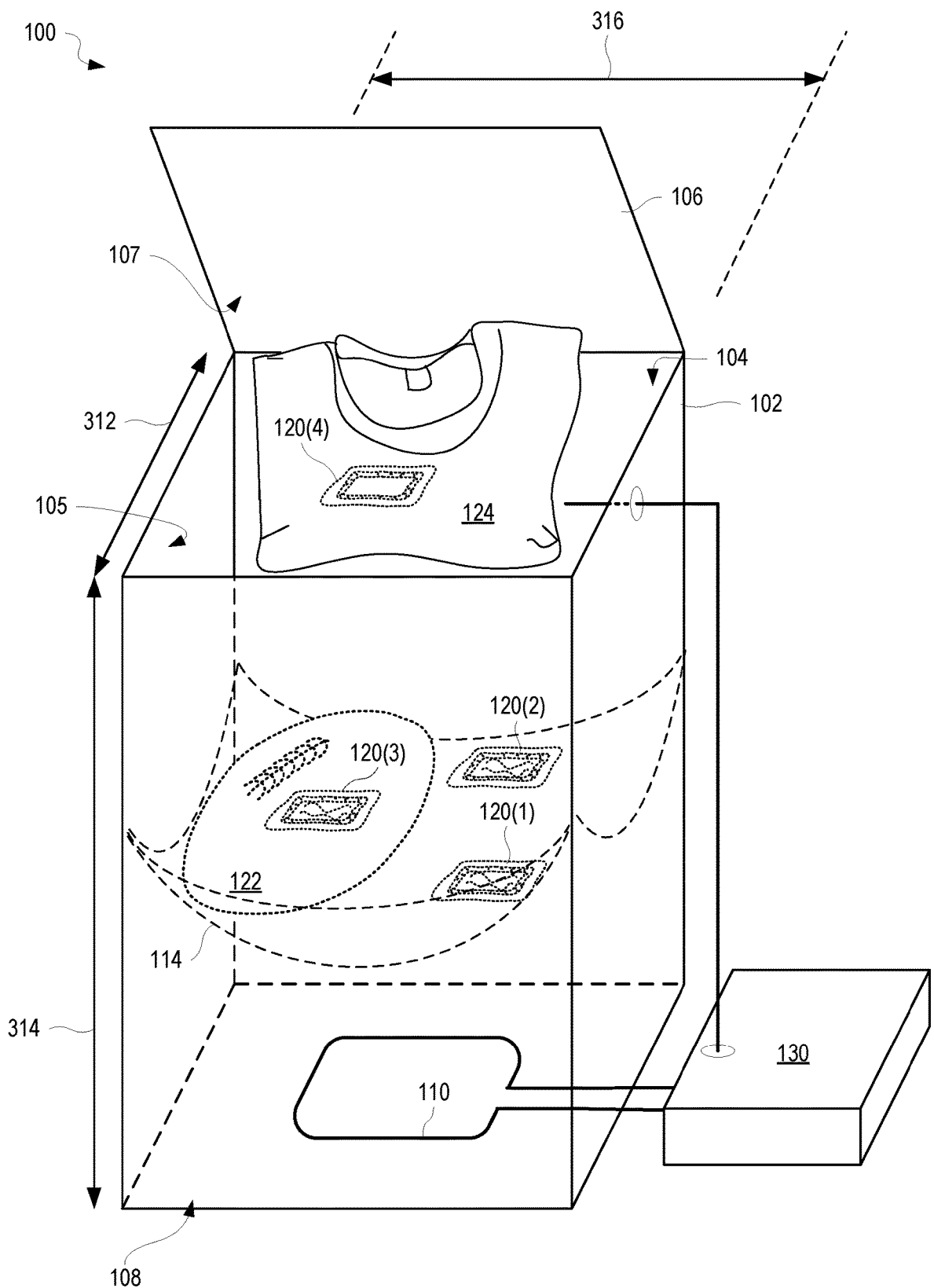
FIG. 3 is a perspective view of the wireless charging system of FIG. 1, in embodiments.

FIG. 1 is a functional diagram illustrating one example of a wireless charging system 100 for simultaneously charging at least one wireless device 120. FIG. 2 is a schematic diagram showing one example of wireless device 120 of FIG. 1. FIG. 3 is a perspective view of wireless charging system 100 of FIG. 1. FIGS. 1-3 are best viewed together with the following description.

Wireless device 120 is, for example, a tracking tag used for tracking athletes and equipment in American football, but may represent any type of wireless device that can be charged via WPT techniques. In this example, wireless device 120 has a flexible protective outer material 202 that encloses and hermetically seals an operational circuit 220, a charging circuit 204, a chargeable battery 210, and one or more whisker antennas 206. When hermetically sealed, wireless device 120 has no external electrical connections or contacts. Battery 210 represents one or more of a rechargeable battery (e.g., lithium-ion battery, lead-acid battery, nickel-cadmium battery, etc.), a capacitor, a supercapacitor, and any other type of electrical energy-storage component. Operational circuit 220, when powered by battery 210, implements functionality of wireless device 120 (e.g., athlete tracking, transmitting/receiving data, sensors, etc.). Charging circuit 204 and one or more whisker antennas 206 facilitate charging of battery 210 by wireless charging system 100. In certain embodiments, each whisker antenna 206 has a length less than one-half of a wavelength λ of an electromagnetic field 112 received by one or more whisker antennas 206. Each whisker antenna 206 receives electromagnetic field 112 as an AC current. Charging circuit 204 includes at least one rectifier 208 that converts the AC current into a DC current for charging battery 210.

Wireless device 120 may form a resonant structure with each of one or more whisker antennas 206 therein. For example, wireless device 120 may have an internal ground plane that cooperates with each whisker antenna 206 to form a resonant transducer, at a resonant frequency $f_r$, that maximizes power conversion from electromagnetic field 112 to the AC current. Charging circuit 204 may include one or more tuning components (e.g., inductors and capacitors) that tune the resonant frequency $f_r$ to coincide with the frequency f of electromagnetic field 112. Accordingly, a length of each whisker antenna 206 may be selected for convenience (e.g., based on a size of wireless device 120) or such that its resonant frequency coincides with f without any tuning components.

Wireless charging system 100 includes a housing 102 that forms a chamber 104 for containing a plurality of wireless devices 120. In embodiments, chamber 104 has a square opening at a top end 103 to allow wireless devices 120 to be added to, and removed from, chamber 104. Specifically, chamber 104 has a first side length 312, a second side length 316 similar to first side length 312, and a height 314. However, chamber 104 may have other cross-section shapes (e.g., rectangular, elliptical, circular, etc.) without departing from the scope hereof. Housing 102 includes a lid 106 that fits into the square opening at top end 103 such that chamber 104 is bounded by six planar sides formed by housing 102 and lid 106. Inner surfaces 105 (e.g., five inside surfaces of housing 102) of chamber 104 are electrically conductive. For example, inner surfaces 105 may be formed from copper film or plate.

Wireless devices 120 may be placed within chamber 104 using a platform 114. In the example of FIG. 3, platform 114 is a mesh net that supports a first wireless device 120(1), a second wireless device 120(2), a third wireless device 120(3) embedded in a football 122, and a fourth wireless device 120(4) embedded within a jersey 124. To prevent platform 114 from interfering with guiding of electromagnetic field 112, platform 114 is best constructed of a dielectric material that is non-absorptive at the frequency f of electromagnetic field 112. Platform 114 positions wireless devices 120, and any object within which wireless devices 120 are embedded, away from transmitting antenna 110 and bottom end 108 so that wireless devices 120 do not couple with a near field emitted by transmitting antenna 110. Platform 114 may additionally position wireless devices 120 away from inner surfaces 105, where energy flux density is lowest (e.g., see Eqn. 4). While FIGS. 1 and 3 show platform 114 as being flexible, platform 114 may alternatively be rigid. Platform 114 may also be removable to facilitate entry of wireless devices 120 into chamber 104, and removal therefrom (i.e., when absorptive lid 106 is open). For example, platform 114 may be a basket that holds wireless devices 120, and that may be inserted into, and removed from, chamber 104 via top end 103. The basket may be rigid so that when it is inserted into chamber 104, a bottom of the basket remains sufficiently far from transmitting antenna 110 and bottom end 108 to ensure that wireless devices 120 (and the basket) do not couple with the near field. Platform 114 may be any other physical structure that positions wireless devices 120 within chamber 104 (i.e., within the hollow electromagnetic waveguide formed by chamber 104).

Inner surfaces 105 cooperate to form a hollow electromagnetic waveguide whose modes, when excited, support propagation of an electromagnetic field therethrough. Specifically, electromagnetic field 112 propagates from a transmitting antenna 110, positioned near a bottom end 108 of chamber 104, to lid 106. Lid 106, or at least an inner-facing surface 107 thereof, absorbs portions of electromagnetic field 112 not absorbed by wireless devices 120.

To reduce reflections that can excite longitudinal modes inside chamber 104, inner-facing surface 107 may be configured with an impedance that matches an impedance of electromagnetic field 112. In this case, chamber 104 resembles a terminated waveguide. Inner-facing surface 107 may be configured with an impedance of approximately 377Ω to impedance-match electromagnetic field 112 to the impedance of free space. However, the impedance of electromagnetic field 112 may be different than 377Ω, as typically occurs for electromagnetic fields propagating along a hollow waveguide. Thus, inner-facing surface 107 may be configured with an impedance different from 377Ω. Inner-facing surface 107 may also be textured (e.g., egg-carton like) to enhance scattering of unabsorbed parts of electromagnetic field 112. In one embodiment, lid 106 is shaped as a Wood's horn that "traps" and dissipates electromagnetic field 112 via multiple reflections therein.

Electromagnetic fields 112 that are coupled into lid 106 via inner-facing surface 107 are absorbed by lid 106, i.e., are attenuated as they propagate through lid 106. Since the electromagnetic power inside the chamber 104 may be high enough to be a safety concern (several tens of watts, or more), a thickness of lid 106 should be selected to ensure that any electromagnetic power that passes unabsorbed through lid 106 is low enough to be safe. This thickness may be determined based on matched impedances of the lid 106 and chamber 104, as this condition maximizes power transfer to from chamber 104 into the bulk of lid 106. Similarly, the thickness of the other five walls of housing 102 may also be selected to ensure that any leakage therethrough is safe. In one embodiment, the lid 106 includes a safety interlock (not shown) that immediately disables operation of transmitting antenna 110 when the lid 106 is open.

In certain embodiments, inner-facing surface 107 is a Salisbury screen or meta-material. In certain embodiments, inner-facing surface 107 is an absorptive surface formed from a composite of a first material that is resistive and a second material that has a relative permittivity greater than one. The higher permittivity allows the thickness (which is related to wavelength) of the second material to be reduced. In another embodiment, inner-facing surface 107 is formed of alternating layers of conductive carbon-fiber cloth and neoprene. In yet another embodiment, inner-facing surface 107 is formed by molding a powdered-graphite-impregnated polyvinyl acetate (white glue) or similar material. In yet another embodiment, a high-permeability material may be used to form inner-facing surface 107, however cost and weight may prohibit its use. In yet another embodiment, inner-facing surface 107 may include a meta-material screen, since the frequency of electromagnetic field 112 varies only a small amount in operation.

Electronics

As shown in FIG. 1, transmitting antenna 110 is electrically connected to a driver 130 that powers transmitting antenna 110 to emit electromagnetic field 112 within chamber 104. Driver 130 includes a frequency synthesizer 132 that generates an oscillating signal 133 whose amplitude is subsequently controlled via a variable attenuator 134. The output of variable attenuator 134 drives a radio-frequency (RF) power amplifier 138 to generate a high-power drive signal 135 that is fed to transmitting antenna 110 via a RF feedline 139. If additional gain is needed, a pre-amplifier 136 may be used to boost the output of variable attenuator 134 prior to RF power amplifier 138, as shown in FIG. 1. A standing-wave ratio (SWR) meter 140 after RF power amplifier 138 measures a SWR indicative of how well an impedance of antenna transmitting 110 matches an impedance of RF feedline 139. SWR meter 140 may be implemented, for example, with one or more directional couplers (i.e., a direction SWR meter), cross-talking cables or transmission lines (i.e., a radio operator SWR meter), a bridge circuit (i.e., a SWR bridge), an impedance analyzer, or another electronic device.

Transmitting antenna 110 may be any type of transducer that, when driven with an electric current (e.g., high-power drive signal 135), emits an electromagnetic field for coupling into chamber 104 (e.g., for exciting the $TE_{10}$ transverse mode of chamber 104). For example, transmitting antenna 110 may be a rod or loop, wherein one or more of its geometry, material, and proximities to inner surfaces 105 of chamber 104 is selected such that transmitting antenna 110 has an impedance matching that of RF feedline 139. In another example, transmitting antenna 110 is a radiating element, and inner surface 105 of bottom end 108 is electrically grounded to form a counterpoise for the radiating element. In this case, a longitudinal distance between the radiating element and bottom end 108 is selected such that the combination has an electrical impedance of 50Ω. In certain embodiments, the longitudinal distance between the radiating element and bottom end 108 is adjustable to create the electrical impedance of 50Ω. With this impedance, RF feedline 139 can be a conventional 50Ω coaxial cable that connects to transmitting antenna 110 without a tuner, and RF power amplifier 138 can be an amplifier with a 50Ω output impedance.

Driver 130 is shown in FIGS. 1 and 3 positioned near bottom end 108 of chamber 104, but could be alternatively positioned near top end 103, wherein the inner surface of bottom end 108 is made absorptive and inner-facing surface 107 of lid 106 is made electrically conductive (i.e., similar to inner surfaces 105).

Driver 130 includes a controller 170 that may represent a computing device physically separate from, but in electronic communication with, housing 102 (e.g., a laptop computer, tablet computer, smartphone, or other such mobile device). Alternatively, controller 170, or any portion thereof, may be implemented as an embedded system physically incorporated with housing 102. In certain embodiments, controller 170 may represent one or more of a microprocessor, microcontroller, field-programmable gate array (FPGA), system-on-chip (SoC), application-specific integrated circuit (ASIC), or another such circuit or chip capable of processing machine-readable instructions. Controller 170 may include, or connect with, a user interface 180 and may include networking capability to provide input to, and display output from, controller 170. Controller 170 may include at least one processor 172 communicatively coupled with memory 174 storing firmware 176 (e.g., software) that includes machine-readable instructions that, when executed by processor 172, control processor 172 to operate wireless charging system 100 as described herein.

Wireless charging system 100 may also include a sense antenna 150 that is positioned within chamber 104 near top end 103 (e.g., at an end opposite drive antenna 110). Sense antenna 150 senses electromagnetic field 112 within chamber 104 and sends a signal to a balanced-impedance signal splitter 152 that outputs: (i) a first split signal 154 to a detector 156, and (ii) a second split signal 158 to a transceiver 162 via a high-pass filter (HPF) 160. In certain embodiments, detector 156 uses first split signal 154 to determine a state of electromagnetic field 112 within chamber 104. For example, detector 156 may determine one or both of a presence of electromagnetic field 112 within chamber 104, and a strength (e.g., power or amplitude) of electromagnetic field 112 within chamber 104.

In one example of operation, a user places at least one wireless device 120 within chamber 104 and closes lid 106. The user may then instruct controller 170, via user interface 180, to start charging the at least one wireless device 120. Firmware 176 controls processor 172 to operate one or more of frequency synthesizer 132, variable attenuator 134, pre-amplifier 136, and RF power amplifier 138 to drive transmitting antenna 110 to generate electromagnetic field 112 within chamber 104. Controller 170 receives feedback 164 from detector 156 indicating a status of electromagnetic field 112 within chamber 104, and one or more signals from SWR meter 140 indicating the SWR of high-power drive signal 135 in RF feedline 139.

Sense antenna 150 may also receive one or more wireless messages from operational circuit 220 of wireless device 120 within chamber 104 (see wireless message 121 in FIG. 1), wherein second split signal 158 is inputted to transceiver 162. HPF 160 blocks electrical signals, at the frequency f of electromagnetic field 112, that are picked up by sense antenna 150. Transceiver 162 may decode second split signal 158 to receive each wireless message and determine, for example, a status of wireless device 120.

In one example of operation, each wireless device 120 periodically transmits a wireless message 121 that includes: (1) a device identifier (ID) that uniquely identifies the wireless device 120, and (2) an indication of a battery level of battery 210 of the wireless device 120. The indication of the energy level may be, for example, a percentage of a maximum capacity of battery 210, or a measured voltage of battery 210.

In another example of operation, each wireless device 120 transmits a status message (e.g., wireless message 121) only in response to an interrogation signal 151 transmitted by controller 170 via sense antenna 150. For example, firmware 176 may, at intervals, pause transmission of electromagnetic signal 112 (e.g., by disabling RF power amplifier 138), control transceiver 162 to transmit interrogation signal 151 via sense antenna 150, and receive, via sense antenna 150 and in response to interrogation signal 151, at least one wireless message 121 from any one or more wireless devices 120 within chamber 104. In certain embodiments, interrogation signal 151 may include one device ID such that only one wireless device 120 with a matching device ID responds to interrogation signal 151. In this way, controller 170 may control transceiver 162 to transmit a plurality of interrogation signals 151, one for each wireless device 120 in chamber 104, at different times so that transceiver 162 receives the corresponding wireless messages 121 without collisions. In certain embodiments, where all wireless devices 120 respond to one interrogation signal 151, wireless devices 120 implement a collision-avoidance technique (e.g., back-off timers) to ensure that the resulting plurality of wireless messages 121 are transmitted at different times, and thus without collisions. After receiving wireless messages 121, firmware 176 may then resume transmission of electromagnetic signal 112 within chamber 104 (e.g., by enabling RF power amplifier 138) to continue charging of wireless devices 120.

When RF power amplifier 138 is disabled, firmware 176 may additionally transmit one or more messages to reprogram or configure any one or more of wireless devices 120 within chamber 104. For example, a wireless device 120 may measure and store telemetry data during normal operation. Firmware 176 may transmit a message instructing wireless device 120 to upload the telemetry data (e.g., as wireless message 121 to transceiver 162 via sense antenna 150). Advantageously, reprogramming, configuring, and uploading of data takes advantage of wireless devices 120 being conveniently located in one place for charging. For example, controller 170 may in communication (e.g., networked) with a tracking computer (not shown) that uses wireless devices 120, and may receive programming information for each wireless device 120 from that tracking computer.

Figure 4:
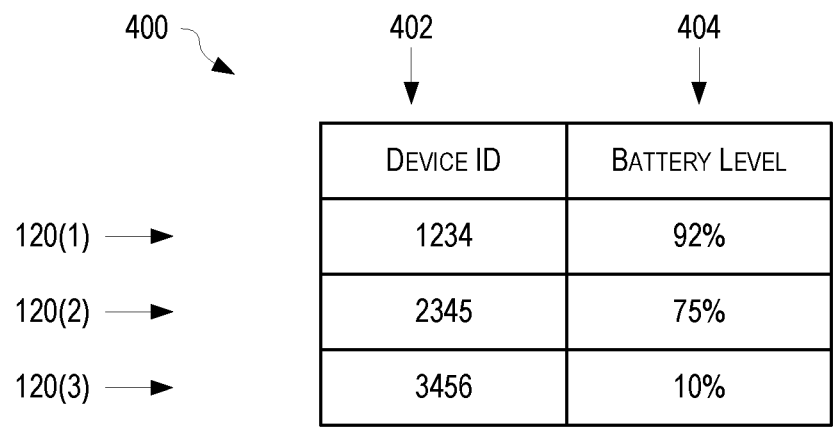
FIG. 4 shows one example of a charge-status table used to track charging of wireless devices, in an embodiment.

FIG. 4 shows one example of a charge-status table 400 used to track charging of wireless devices 120. Charge-status table 400 has a plurality of rows, each storing one device ID 402 that uniquely identifies one corresponding wireless device 120 detected within chamber 104. Each row also stores a battery level 404 of battery 210 of the corresponding one wireless device 120; in FIG. 4, the battery level 404 is a percentage of a maximum capacity. Firmware 176 stores charge-status table 400 in memory 174 of controller 170, and generates and updates charge-status table 400 based on wireless messages 121 received from wireless devices 120. A number of rows of charge-status table 400 may equal a number of wireless device 120 detected within chamber 104. In the example of FIG. 4, charge-status table 400 has three rows storing three device IDs (i.e., 1234, 2345, and 3456) corresponding to first, second, and third wireless devices 120(1), 120(2), and 120(3), respectively, detected within chamber 104. Prior to charging, firmware 176 may communicate with wireless devices 120 (e.g., via wireless messages 121) to obtain initial values of battery levels 404. During subsequent charging, firmware 176 may, at intervals, pause charging to communicate with wireless devices 120 and update battery levels 404, as described above.

In certain embodiments, firmware 176 instructs processor 172 to display, and update in real-time, charge-status table 400 on user interface 180. In these embodiments, each row of charge-status table 400 may be displayed based on its corresponding battery level 404. For example, when a battery level 404 exceeds a threshold, the corresponding row may be displayed in a color (e.g., green) indicating that the corresponding wireless device 120 is nearly fully charged. If the battery level 404 does not exceed the threshold, the corresponding row is displayed in a different color (e.g., yellow) indicating that the corresponding wireless device 120 is not fully charged. In another example, when a battery level 404 surpasses the threshold, the corresponding row of charge-status table 400 is removed from user interface 180 such that only wireless devices 120 that are not fully charged are displayed.

Figure 5:
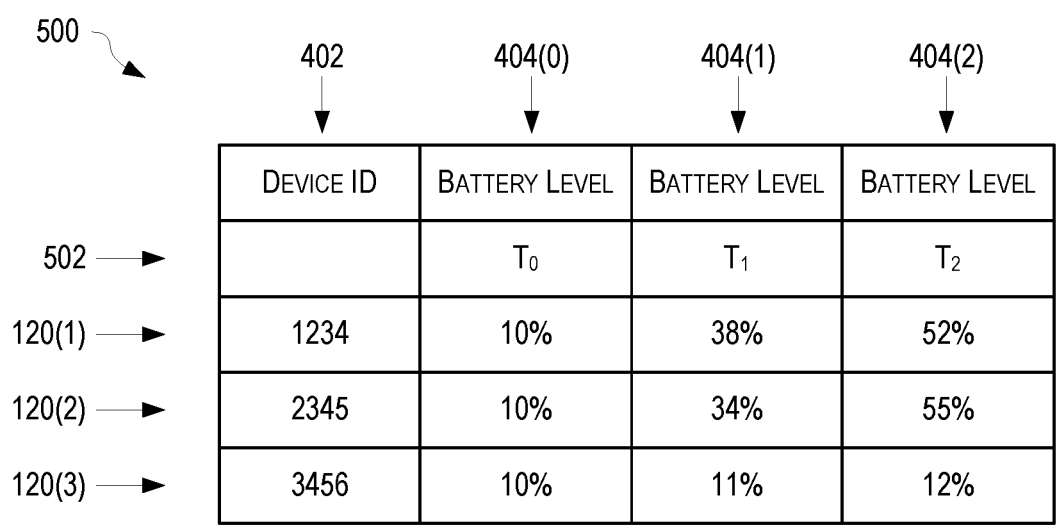
FIG. 5 shows one example of a charge-status table that tracks battery levels over time to determine a charging rate for each wireless device, in an embodiment.

FIG. 5 shows one example of a charge-status table 500 that tracks battery levels 404 over time to determine a charging rate for each wireless device 120. Charge-status table 500 is similar to charge-status table 400 of FIG. 4, except that charge-status table 500 stores a plurality of battery levels 404 for each wireless device 120, each of the battery levels 404 being obtained at a different time 502. For example, charge-status table 500 includes a column of initial battery levels 404(0) obtained from wireless devices 120 at an initial time $T_0$, a column of first battery levels 404(1) obtained from wireless devices 120 at a first time $T_1$, and a column of second battery levels 404(2) obtained from wireless devices 120 at a second time $T_2$. For each wireless device 120, firmware 176 may determine a linearly-approximated charging rate by dividing a difference in battery levels by a difference in corresponding times. Thus, for first wireless device 120(1), the charging rate between times $T_0$ and $T_1$ is approximately $(38\%-10\%)/(T_1-T_0)$, and the charging rate between times $T_1$ and $T_2$ is approximately $(52\%-38\%)/(T_2-T_1)$. Charging rates for second wireless device 120(2) and third wireless device 120(3) may be calculated similarly. Although charge-status table 500 only shows three columns of battery levels 404 obtained at three corresponding times 502, charge-status table 500 may have any number of columns of battery levels 404 obtained at the same number of corresponding times 502. Alternatively, charge-status table 500 may only have a fixed number of n columns, wherein battery levels for each wireless device 120 are stored cyclically across the n columns such that only the most recently n battery levels of each wireless device 120 are stored in charge-status table 500.

Based on the determined charging rates, firmware 176 may determine whether a corresponding wireless device 120 is charging efficiently. In the example of FIG. 5, the battery level for third wireless device 120(3) only changes by 1% between times $T_0$ and $T_1$, and between times $T_1$ and $T_2$, and thus third wireless device 120(3) does not appear to be charging as fast as first and second wireless devices 120(1) and 120(2). In this case, firmware 176 may instruct processor 172 to display a message via user interface 180 indicating that third wireless device 120(3) is not charging properly and should be investigated. For example, charge-status table 500 may be displayed on user interface 180 with only the most-recent battery levels. Each wireless device 120 that is identified as not charging properly may be displayed in a color (e.g., red) that differentiates these wireless devices 120 from those that are charging properly (e.g., yellow) and those that are fully charges (e.g., green).

In some embodiments, firmware 176 instructs controller 170 to change a power or amplitude of electromagnetic field 112 based on a number of wireless devices 120 within chamber 104. The number of wireless devices 120 may be determined, for example, from a number of rows of charge-status table 400. When the number of wireless devices 120 is low (e.g., 5 or less), controller 170 may communicate with variable attenuator 134 to increase attenuation of oscillating signal 133, thereby reducing the power of high-power drive signal 135. Alternatively, when the number of wireless devices 120 is high (e.g., 50 or more), controller 170 may communicate with variable attenuator 134 to decrease attenuation of oscillating signal 133, thereby increasing the power of high-power drive signal 135 (assuming that RF power amplifier 138 is not saturated).

In certain embodiments, chamber 104 may include a mechanical, electrically non-conductive structure that, under control of firmware 176, moves wireless devices 120 within chamber 104 to ensure that each receives a similar amount of energy from electromagnetic field 112. For example, chamber 104 may include a plastic platter (e.g., basket, net, etc.) on which wireless devices are placed, and that is one or more of rotated, raised, and lowered.

In certain embodiments, wireless charging system 100 may include multiple transmitting antennae 110 positioned at a different angle or spacing to each other within chamber 104. In one embodiment, multiple antennae 110 are multiplexed, wherein firmware 176 selectively drives one of antennae 110 based on feedback from wireless device 120 within chamber 104. In another embodiment, antennae 110 are simultaneously driven with different phases to implement a phased array.

RF power amplifier 138 may be either a linear amplifier (e.g., class A) or a high-efficiency switchmode amplifier (e.g., class D). In the latter case, the output (i.e., the power of high-power drive signal 135) may be controlled by adjusting a duty cycle of the amplifier, either in addition to or instead of variable attenuator 134.

In certain embodiments, firmware 176 monitors the SWR of high-power drive signal 135, via SWR meter 140, and instructs controller 170 to shut down RF power amplifier 138 if reflections from transmitting antenna 110 are high enough to damage RF power amplifier 138. Such high-power reflections may indicate improper operation of wireless charging system 100, such as wireless devices 120 that are located too close to transmitting antenna 110, improper grounding of bottom end 108, improper connection of RF feedline 139, metallic objects located inside chamber 104, movement of transmitting antenna 110, or lid 106 not being fully closed. Firmware 176 may additionally control processor 172 to indicate, via user interface 180, that the SWR is too high, and that housing 102 should be investigated.

Wavelength, Frequency, and Chamber Size

One factor that may be taken into consideration when designing wireless charging system 100 is that transverse dimensions of chamber 104 (e.g., one or both of first side length 312 and second side length 316) are related to the wavelength $\lambda$ and frequency f of electromagnetic field 112 according to a dispersion equation. For a hollow rectangular waveguide with a first transverse dimension a (e.g., first side length 312) that is greater than a second transverse dimension b (e.g., second side length 316), the dispersion equation is $$f^2 = (f_{10}^{(c)})^2 + \frac{c^2}{\lambda^2} = \frac{c^2}{4a^2 + \lambda^2}, \quad (6)$$

where $f_{10}^{(c)} = c/(2a)$ is a cutoff frequency for the lowest-frequency $TE_{10}$ mode, and c is the speed of light. From Eqn. 6, the frequency f is less than its free-space value of $c/\lambda$, and the wavelength $\lambda$ is greater than its free-space value of $c/f$. Note that the wavelength is sometimes referred to as the "guide wavelength" to distinguish it from the free-space wavelength.

A volume of chamber 104 (e.g., any one or more of first transverse length 312, second transverse length 316, and height 314) may be selected to accommodate one or more wireless devices 120, one or more objects within which one or more wireless devices 120 are embedded, or a combination thereof. One of both of the transverse dimensions of chamber 104, as based on the selected volume, may then be used with the dispersion equation (e.g., Eqn. 6) to determine an appropriate frequency f, and frequency synthesizer 132 may be set accordingly. Alternatively, a desired frequency f may first be selected, which may then be used with the dispersion equation to determine the wavelength $\lambda$, the transverse dimensions of chamber 104, and thus the volume of chamber 104.

The frequency f must be greater than the cutoff frequenc $f_{10}^{(c)}$ for the lowest-frequency $TE_{10}$ mode to excite. However, if the frequency f is too large, then a second-lowest-frequency mode will excite, resulting in multimode operation that changes the energy flux density from the mathematical form of Eqn. 4. Specifically, if b<a/2, the second-lowest-frequency mode is the $TE_{02}$ mode, whose cutoff frequency $f_{20}^{(c)}$ is twice that of the $TE_{01}$ mode, i.e., $f_{20}^{(c)} = 2f_{10}^{(c)}$. However, if b>a/2, then the second-lowest-frequency mode is the transverse-magnetic $TM_{01}$ mode whose cutoff frequency is $f_{01}^{(c)} = c/2b$. As b approaches a, $f_{01}^{(c)}$ approaches $f_{10}^{(c)}$ and the single-mode bandwidth $\Delta f$, or range of frequencies f over which the waveguide will operate only in the $TE_{01}$ mode, decreases. Thus, to ensure a sufficiently large single-mode bandwidth $\Delta f$, it may be desirable for chamber 104 to have a rectangular cross section (e.g., second side length 316 is less than first side length 312), as opposed to the square cross section shown in FIG. 3.

Once the transverse dimensions of chamber 104 are determined, a longitudinal dimension L (e.g., height 314) of chamber 104 may be then determined to prevent excitation of longitudinal modes that could result in a non-uniform energy flux density within chamber 104. A longitudinal mode is excited when the longitudinal dimension L equals an integer multiple of $\lambda/2$. The lowest-frequency longitudinal mode thus has a frequency of $2c/L$. As the frequency f approaches the critical frequency $f_{10}^{(c)}$, the wavelength $\lambda$ grows according to $$\lambda = \frac{c}{\sqrt{f^2 - (f_{10}^{(c)})^2}}. \quad (7)$$

Thus, by selecting the frequency f close to $f_{10}^{(c)}$, the wavelength $\lambda$ can be made large, and the longitudinal dimension L can be increased while still preventing excitation of the lowest-frequency longitudinal mode at $\lambda/2$. However, as the frequency f approaches the critical frequency $f_{10}^{(c)}$, losses due to the finite electrical conductivity of inner surfaces 105 increases. Mathematically, the wave impedance $\eta_{TE}$ depends on the frequency f according to:

$$\eta_{TE} = \frac{\eta}{\sqrt{1 - (f_{10}^{(c)}/f)^2}}, \quad (8)$$

where $\eta$ is the wave impedance is free space (e.g., approximately 377$\Omega$ if chamber 104 is filled with air or vacuum). Thus, the Poynting vector $P_z$ of Eqn. 4 can be written more generally as $$P_Z = \frac{1}{\eta} |E_0|^2 \sqrt{1 - (f_{10}^{(c)}/f)^2} \sin^2\left(\frac{\pi x}{a}\right), \quad (9)$$

which shows that the energy flux density goes to zero as f approaches $f_{10}^{(c)}$. Thus, as shown by Eqns. 7-9, the choice of frequency f within the single-mode bandwidth $\Delta f$ gives rise to a trade-off between the amount of transmitted power and excitation of a longitudinal mode.

Another factor that may be taken into consideration when designing wireless charging system 100 is an operational frequency of operational circuit 220. If the frequency f of electromagnetic field 112 were to coincide with the operational frequency, or a harmonic thereof, operational circuit 220 could be damaged by power received by wireless device 120. Accordingly, the frequency f may be selected to avoid the operational frequency and its harmonics.

As an example of the above considerations, assume that operational circuit 220 of wireless device 120 includes a transceiver and antenna operating at 6.5 GHz. Selecting, for example, transverse dimensions of a=0.4 m and b=0.35 m yields $f_{10}^{(c)} = c/2a = 375$ MHz. The single-mode bandwidth $\Delta f$ extends from $f_{10}^{(c)}$ up to $c/2b = 428.5$ MHz (i.e., the cut-off frequency $f_{10}^{(c)}$ of the $TM_{10}$ mode). All values of f within the single-mode bandwidth $\Delta f$ are significantly far from the operational frequency of 6.5 GHz to limit damage to operational circuit 220.

In the previous example, consider f=400 MHz, which lies near the center of the single-mode bandwidth $\Delta f$. For this value of f, the wavelength $\lambda$, as determined by Eqn. 7, is 2.15 m, from which a longitudinal distance L of, for example, 70 cm may be selected. From Eqn. 9, power transmission is reduced by a factor of $(1-(f_{10}^{(c)}/f)^2)^{1/2} = 0.35$, as compared to the theoretical infinite-frequency limit (i.e., where the square-root term of Eqn. 9 equals 1). Increasing f to 425 MHz decreases λ to 1.5 m and increases power transmission to 0.47 of the infinite-frequency limit. Alternatively, decreasing f to 380 MHz increases λ to 4.9 m and decreases power transmission to 0.16 of the infinite-frequency limit.

The above discussion assumes that electromagnetic field 112 propagates as a steady-state excitation throughout chamber 104. However, when the longitudinal dimension L of chamber 104 is less than λ/2, electromagnetic field 112 may not reach its steady state prior to reaching lid 106. In this case, the Poynting vector will likely be more complicated than that of Eqn. 9. For instance, transmitting antenna 110 may excite higher-order modes of the waveguide, but with a frequency f below their cutoff frequencies. In this case, these higher-order excitations are not "guided" and will be attenuated exponentially with longitudinal distance. However, some of the energy in these non-guided, higher-order excitations may reach and couple into wireless devices 120.

Another factor that may be taken into consideration when designing, and especially when operating, wireless charging system 100 is how the presence of wireless devices 120 inside chamber 104 affects its operation. Wireless devices 120, including objects within which one or more wireless devices 120 are embedded, act as dielectric materials whose presence in chamber 104 affects the cutoff frequencies, wavelength λ (e.g., Eqn. 7), wave impedance (e.g., Eqn. 8), Poynting vector (e.g., Eqn. 9), and other physical quantities. Each wireless device may be represented by a complex dielectric constant whose imaginary component represents absorption of power from chamber 104, and thus can be modeled as a mechanism by which power is lost from chamber 104. All these physical quantities may further depend on the specific locations of wireless devices 120 within chamber 104, and thus operation of wireless charging system 100 may vary from one cycle (i.e., charging a first batch of wireless devices 120) to a second cycle (i.e., charging a second batch of wireless devices 120). To some extent, changes to how wireless charging system 100 operates between cycles can be compensated for by varying the frequency f.

When wireless devices 120 are located in chamber 104 sufficiently far from transmitting antenna 110, wireless devices 120 will not appreciably interact with the near field emitted by transmitting antenna 110. In this case, wireless devices 120, regardless of their number in chamber 104, do not affect the reactive energy stored in the near field, and therefore negligibly impact the antenna impedance of transmitting antenna 110. For example, at f=400 MHz, the minimal distance to transmitting antenna 110 is approximately a few centimeters. Thus, most of the volume of chamber 104 is in the far-field region of transmitting antenna 110.

As the number of wireless devices 120 within chamber 104 increases, so does the amount of power absorbed from electromagnetic field 112. At a certain point, the number of wireless devices 120 within chamber 104 may be large enough that chamber 104 no longer acts like a waveguide. In this case, transmitting antenna 110 may be operated at a higher power, if RF power amplifier 138 is capable of outputting the higher power. Alternatively, the number of wireless devices 120 within chamber 104 may be reduced.

In some embodiments, wireless charging system 100 operates with multiple electromagnetic fields 112 of different frequencies. For example, transmitting antenna 110 may be a broadband antenna that electrically driven with multiple frequencies simultaneously. Alternatively, transmitting antenna 110 may be a resonant structure driven at two or more harmonics simultaneously. Alternatively, the chamber 104 includes more than one transmitting antenna 110, each generating an electromagnetic field 112 at a different frequency. In any case, the wireless devices 120 many have antennas (e.g., whisker antenna 206) of different sizes to resonate at the different frequencies. Thus, in these embodiments, wireless charging system 100 can simultaneously charge wireless devices 120 with different types of antennas.

Method Embodiments

Figure 6:
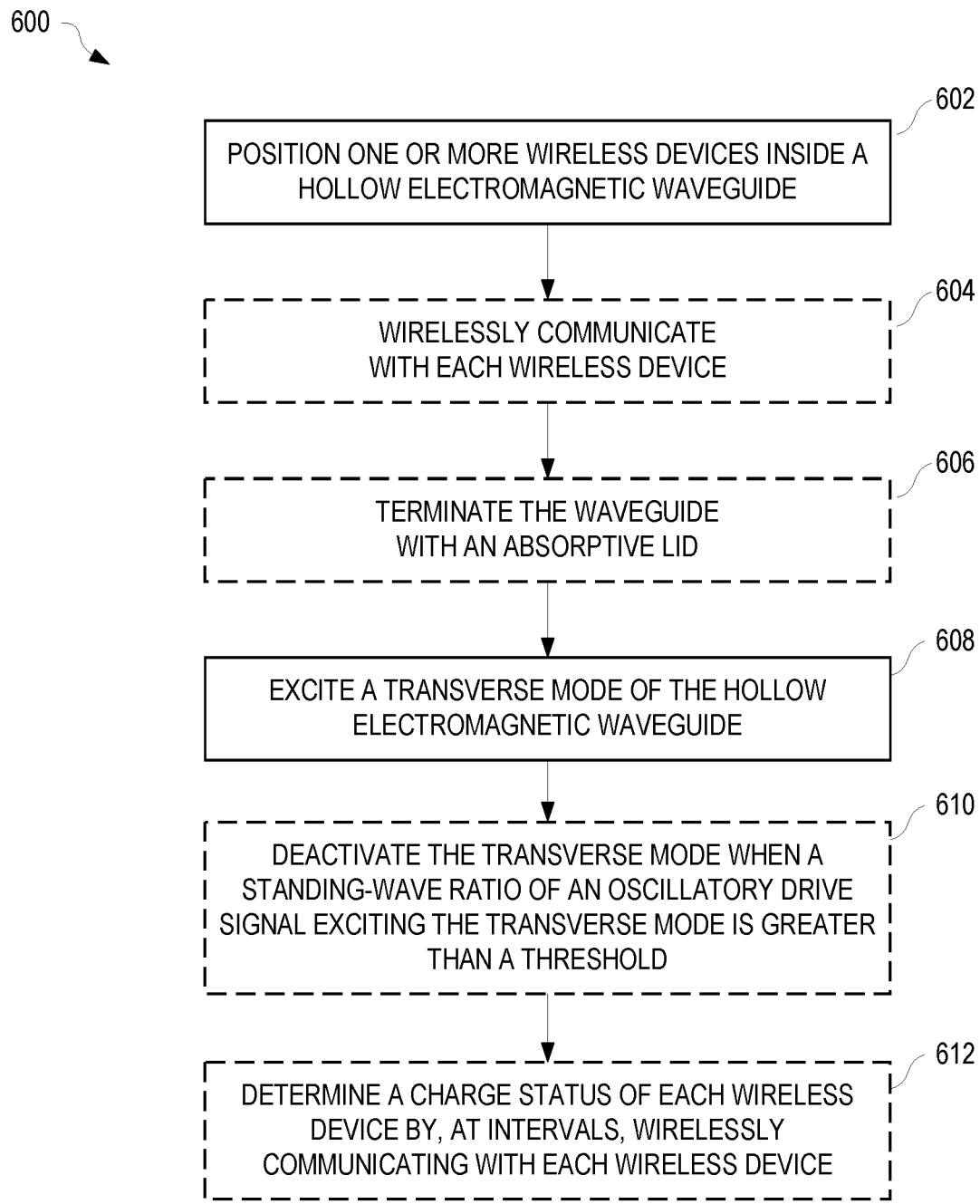
FIG. 6 is a flowchart illustrating one example method for wirelessly charging the wireless device of FIG. 2, in embodiments.

FIG. 6 is a flowchart illustrating one example method 600 for wirelessly charging wireless device 120 of FIG. 2. Method 600 is, for example, implemented, at least in part, by firmware 176 of controller 170 within driver 130 of wireless charging system 100, and in part within wireless device 120 positioned within wireless charging system 100.

In a block 602 of method 600, one or more wireless devices are positioned inside a hollow electromagnetic waveguide. In one example of block 602, one or more wireless devices 120 are placed within chamber 104 of wireless charging system 100, wherein inner-facing surfaces of chamber 104 are electrically conductive such that chamber 104 forms an electromagnetic waveguide.

In a block 608 of method 600, a transverse mode of the hollow electromagnetic waveguide is excited by an electromagnetic field. The hollow electromagnetic waveguide guides the electromagnetic field along the hollow electromagnetic waveguide. In one example of block 608, driver 130 feeds transmitting antenna 110 with high-power drive signal 135 to emit electromagnetic field 112 into chamber 104. Each wireless device, of the one or more wireless devices, converts a portion of the guided electromagnetic field into a current for recharging a battery of said each wireless device. For example, each wireless device 120 inside chamber 104 uses one or more whisker antennas 206 to receive a portion of electromagnetic field 112 as an AC current for charging battery 210.

In certain embodiments, method 600 includes a block 604 in which an identity of each wireless device, of the one or more wireless devices, is determined by wirelessly communicating with each wireless device. In one example of block 604, controller 170 receives, via sense antenna 150 and from each of wireless device 120 within chamber 104, message 121 that includes a corresponding device ID. Within each message 121, each wireless device 120 may additionally communicate an initial battery level.

In certain embodiments, method 600 includes a block 606 in which the hollow electromagnetic waveguide is terminated with a lid that absorbs a remaining portion of the guided electromagnetic field that is not absorbed by the one or more wireless devices. In one example of block 608, chamber 104 is bounded at top end 103 by an absorptive lid 106 that may be opened to allow wireless devices 120 to be placed within chamber 104, and closed to serve as a termination for electromagnetic field 112. Inner-facing surface 107 of lid 106 may be configured to absorb any portion of electromagnetic field 112 not absorbed by wireless devices 120.

In certain embodiments, method 600 includes a block 610 in which the transverse mode is deactivated when a SWR of an oscillatory drive signal exciting the transverse mode is greater than a threshold. In one example of block 610, SWR meter 140 measures an SWR of high-power drive signal 135 driving RF feedline 139 to transmitting antenna 110 and instructs controller 170 to shut down RF power amplifier 138 when reflections from transmitting antenna 110 are high enough to damage RF power amplifier 138.

In certain embodiments, method 600 includes a block 612 in which a charge status of each wireless device is determined by, at intervals, wirelessly communicating with each wireless device. In one example of block 612, firmware 176 may, at intervals, pause transmission of electromagnetic signal 112 (e.g., by disabling RF power amplifier 138), control transceiver 162 to transmit interrogation signal 151 via sense antenna 150, and receive, via sense antenna 150 and in response to interrogation signal 151, at least one wireless message 121 indicating a charge status of chargeable battery 210 from any one or more wireless devices 120 within chamber 104.

Additional Embodiments

Figure 7:
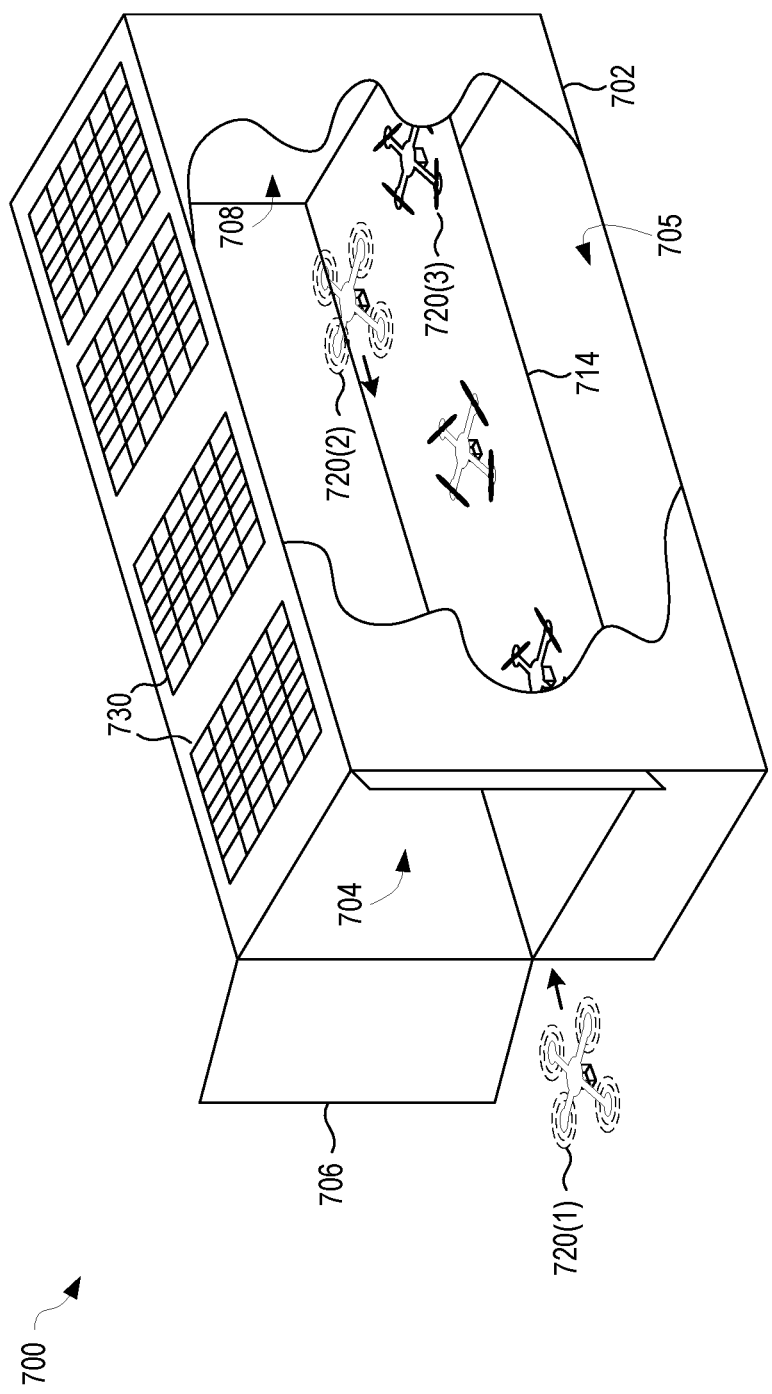
FIG. 7 shows an exemplary drone hive for wirelessly charging a plurality of drones, in embodiments.

FIG. 7 shows an exemplary drone hive 700 for wirelessly charging a plurality of drones 720. Drone hive 700 is similar to wireless charging system 100 of FIG. 1, except that drone hive 700 is sized and configured such that drones 720 can fly into and out of drone hive 700. Like wireless charging system 100, drone hive 700 includes a housing 702 that forms a chamber 704 whose inner surfaces 705 are electrically conductive such that chamber 704 forms a hollow electromagnetic waveguide. Housing 702 includes a door 706 that opens to allow drones 720 to fly into and out of the drone hive 700. When door 706 is closed, it serves as an absorptive lid that operates similarly to absorptive lid 106 of FIGS. 1 and 3.

A transmitting antenna (not shown) similar to transmitting antenna 110 of FIG. 1 is located inside of chamber 704 near a base 708 of chamber 704. The transmitting antenna is configured to emit an electromagnetic field that is guided by chamber 704 toward door 706. Like wireless devices 120, each of drones 720 is equipped with one or more antennas for converting a portion of the guided electromagnetic field into an AC current (e.g., see whisker antennas 206 in FIG. 2), a charging circuit for processing the AC current (e.g., see charging circuit 204 in FIG. 2), and one or more rechargeable batteries (e.g., see battery 210 in FIG. 2).

As a first drone 720(1) approaches drone hive 700, it may wirelessly communicate with drone hive 700 to request entry. In response, drone hive 700 pauses charging, if in progress, and opens door 706 when there is sufficient space inside for first drone 720(1). Drone hive 700 may additionally communicate to first drone 720(1) where it should come to rest on a platform 714 such that first drone 720(1) does not crash into other drones 720 already at rest on platform 714. To preserve power during wireless charging, rotors of the drones 720 are stopped (e.g., see drone 720(3) in FIG. 7). When a drone 720 has finished charging, charging is paused and door 706 is opened, the drone restarts its rotors, and leaves drone hive 700 (e.g., see drone 720(2) in FIG. 7). After the charged drone 720 has exited, the door 706 may be closed so that wireless charging of remaining drones 720 inside of drone hive 700 can continue.

In some embodiments, drone hive 700 includes one more photovoltaic panels 730 that convert sunlight into electrical power for driving the transmitting antenna, operating door 706, and implementing other functionality of drone hive 700. Advantageously, by using photovoltaic panels 730, drone hive 700 may operate without connection to an electrical power grid, or when the electrical power grid is not operational (e.g., during a black-out). In these embodiments, the emitted electromagnetic field is guided horizontally (i.e., perpendicularly to gravity), and the platform 714 is oriented horizontally, such that photovoltaic panels 730 point upward towards the sun. In this case, door 706 is on a side of drone hive 700, as shown in FIG. 7. However, the position of door 706 and orientation of drone hive 700 may vary without departing from the scope hereof. Applications of solar-powered drone hive 700 include monitoring or surveillance by drones 720 over large remote areas (e.g., forests or deserts). In certain embodiments, drones 720 and drone hive 700 may operate autonomously. Alternatively, solar-powered drone hive 700 may be placed on a floating platform for monitoring by drones 720 over a large body of water (e.g., an ocean) or in the sky (e.g., using a balloon type platform).

Drone hive 700 may be sized to accommodate several drones 720 therein. For example, transverse dimensions of drone hive 700 (corresponding to transverse lengths 312 and 316 in FIG. 3) may be 4 m, and a height of drone hive 700 (corresponding to height 314 in FIG. 3) may be 10 m. In this case, the lowest cut-off frequency of the waveguide is 37.5 MHz, and the frequency of the electromagnetic field may be selected, for example, to be 40 MHz, for which the guide wavelength is 21.6 m. Drone hive 700 may have even larger dimensions, and a lower frequency of the electromagnetic field accordingly, without departing from the scope hereof.

In other embodiments, drone hive 700 is configured such that land-based unmanned vehicles or mobile robots may autonomously drive into drone hive 700 when door 706 is open. Alternatively, electric bikes may be parked inside of drone hive 700 (e.g., by riders) and wirelessly charged once the riders have exited drone hive 700 and door 706 is closed.

In other embodiments, drone hive 700 orbits in space and serves as a wireless recharging station for small satellites (e.g., CubeSats, microsats, nanosats, etc.). Advantageously, drone hive 700, when operating as a satellite recharging station, may advantageously reduce the size and weight of satellites by providing an alternative power source to large, bulky solar panel wings. Rather, drone hive 700 may include solar panel wings that receive power from the sun and wirelessly transfer the power to the satellites via the emitted electromagnetic field. Small satellites may use electric propulsion systems to move into and out of drone hive 700. In addition, drone hive 700 may operate without door 706, in which case it may be advantageous for drone hive 700 to be oriented such that the escaping radiation propagates away from Earth (or other satellites that could be affected by the escaping radiation). Also in these embodiments, electromagnetic emissions from drone hive 700 are less of a concern than they would be on Earth, and thus electrically conductive inner surfaces 705 may be configured as a mesh with sub-wavelength openings. In this case, the sub-wavelength openings reduce the mass of drone hive 700 while still ensuring that minimal electromagnetic emissions leak therethrough and correct satellite charging.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:
1. A wireless charging system, comprising:
a hollow electromagnetic waveguide;
an input coupler located near a first longitudinal end of the hollow electromagnetic waveguide, the input coupler being operable to excite a propagation mode of the hollow electromagnetic waveguide;

an absorptive material located near a second longitudinal end of the hollow electromagnetic waveguide; and a platform within the hollow electromagnetic waveguide such that at least one wireless device positioned on the platform converts electromagnetic energy from the propagation mode into electrical energy;

wherein the absorptive material is configured to absorb electromagnetic energy from the propagation mode that is not converted into electrical energy by the at least one wireless device.

2. The wireless charging system of claim 1, the second longitudinal end further comprising an openable lid.

3. The wireless charging system of claim 2, the absorptive material being affixed to the openable lid such that the absorptive material terminates the hollow electromagnetic waveguide when the openable lid is closed.

4. The wireless charging system of claim 1, the first longitudinal end of the hollow electromagnetic waveguide having an electrically conductive layer facing inside the hollow electromagnetic waveguide.

5. The wireless charging system of claim 1,
the hollow electromagnetic waveguide having transverse dimensions such that the input coupler only excites a transverse electric $TE_{10}$ mode.

6. The wireless charging system of claim 1, the platform being configured to position the at least one wireless device away from the input coupler such that the at least one wireless device does not couple with a near field that is generated by the input coupler when the input coupler is electrically driven.

7. The wireless charging system of claim 1, further comprising a driver configured to electrically drive the input coupler.

8. The wireless charging system of claim 4, wherein the electrically conductive layer is grounded to form a counterpoise for the input coupler.

9. The wireless charging system of claim 1, further comprising a sense antenna located inside the hollow electromagnetic waveguide.

10. The wireless charging system of claim 1, the hollow electromagnetic waveguide having either a square cross section or a rectangular cross section.

11. A wireless power transfer (WPT) method, comprising:
positioning one or more wireless devices inside a hollow electromagnetic waveguide; and
exciting, near a first longitudinal end of the hollow electromagnetic waveguide, a propagation mode of the hollow electromagnetic waveguide;
converting, with each wireless device of the one or more wireless devices, electromagnetic energy from the propagation mode into electrical energy; and
absorbing, with an absorptive material located near a second longitudinal end of the hollow electromagnetic waveguide, electromagnetic energy from the propagation mode that is not converted into electrical energy by the one or more wireless devices.

12. The WPT method of claim 11, further comprising charging a battery of said each wireless device with the electrical energy.

13. The WPT method of claim 11, wherein:
the second longitudinal end comprises a lid; and
the method further comprises:
opening the lid prior to said positioning; and
closing the lid after said positioning.

14. The WPT method of claim 11, further comprising wirelessly communicating, prior to said exciting, with each wireless device, of the one or more wireless devices, to determine an identity of said each wireless device.

15. The WPT method of claim 11, wherein said exciting includes electrically driving an input coupler positioned near the first longitudinal end of the hollow electromagnetic waveguide.

16. The WPT method of claim 15, wherein said positioning includes positioning the one or more wireless devices away from the input coupler so that the one or more wireless devices do not couple with a near field generated by the input coupler.

17. The WPT method of claim 15, where said electrically driving includes feeding an oscillatory drive signal from a power amplifier to the input coupler.

18. The WPT method of claim 17, further comprising:
monitoring a standing-wave ratio of the oscillatory drive signal; and
disabling the power amplifier when the standing-wave ratio exceeds a threshold.

19. The WPT method of claim 12, further comprising:
pausing, at intervals, said exciting the hollow electromagnetic waveguide;
transmitting an interrogation signal within the hollow electromagnetic waveguide;
receiving, from at least one wireless device, of the one or more wireless devices, a status message indicating a battery level of the battery of the at least one wireless device; and
resuming said exciting the hollow electromagnetic waveguide if the battery level is below a threshold.

20. The wireless charging system of claim 1, the input coupler comprising one of a probe coupler and a magnetic loop coupler.

* * * * *